United States Patent
O'Keeffe et al.

(10) Patent No.: US 8,482,517 B1
(45) Date of Patent: Jul. 9, 2013

(54) PROGRAMMABLE ANALOG KEYS FOR A CONTROL DEVICE

(75) Inventors: Denis O'Keeffe, Newmarket Co. Cork (IE); Christophe Dayer, Onex (CH); Damine O'Sullivan, Douglas (IE); Timothy O'Sullivan, Bantry (IE)

(73) Assignee: Logitech Europe S.A., Romanel-Sur-Morges (CH)

( * ) Notice: Subject to any disclaimer, the term of this patent is extended or adjusted under 35 U.S.C. 154(b) by 884 days.

(21) Appl. No.: 12/352,455

(22) Filed: Jan. 12, 2009

(51) Int. Cl.
*G09G 5/00* (2006.01)

(52) U.S. Cl.
USPC ............ 345/156; 345/157; 345/162; 345/163

(58) Field of Classification Search
None
See application file for complete search history.

(56) References Cited

U.S. PATENT DOCUMENTS

| | | | | |
|---|---|---|---|---|
| 5,434,566 A * | 7/1995 | Iwasa et al. | | 341/34 |
| 5,515,044 A * | 5/1996 | Glatt | | 341/22 |
| 5,784,052 A * | 7/1998 | Keyson | | 345/167 |
| 5,815,139 A * | 9/1998 | Yoshikawa et al. | | 345/157 |
| 5,995,026 A * | 11/1999 | Sellers | | 341/34 |
| 6,243,078 B1 * | 6/2001 | Rosenberg | | 345/161 |
| 6,278,439 B1 * | 8/2001 | Rosenberg et al. | | 345/157 |
| 6,646,632 B2 * | 11/2003 | Loughnane et al. | | 345/163 |
| 7,102,541 B2 * | 9/2006 | Rosenberg | | 341/20 |
| 7,307,619 B2 * | 12/2007 | Cunningham et al. | | 345/163 |
| 7,355,595 B2 * | 4/2008 | Bathiche et al. | | 345/173 |
| 7,489,309 B2 * | 2/2009 | Levin et al. | | 345/184 |
| 2004/0032395 A1 * | 2/2004 | Goldenberg et al. | | 345/156 |
| 2004/0222968 A1 * | 11/2004 | Endo et al. | | 345/161 |
| 2006/0001657 A1 * | 1/2006 | Monney et al. | | 345/184 |
| 2006/0274042 A1 * | 12/2006 | Krah et al. | | 345/163 |
| 2009/0020343 A1 * | 1/2009 | Rothkopf et al. | | 178/18.05 |
| 2009/0058819 A1 * | 3/2009 | Gioscia et al. | | 345/173 |
| 2009/0184921 A1 * | 7/2009 | Scott et al. | | 345/156 |
| 2009/0207129 A1 * | 8/2009 | Ullrich et al. | | 345/156 |

* cited by examiner

*Primary Examiner* — Dismery Mercedes
(74) *Attorney, Agent, or Firm* — Kilpatrick Townsend & Stockton LLP

(57) ABSTRACT

A control devices includes a key having a top surface configured to be pressed by a user, and a resistance device coupled to the key and configured to provide a resistance force to the key that opposes a user force applied to the top surface. A force sensor is coupled to the resistance device and is configured to detect the user force applied to top surface. A control circuit is coupled to the resistance device and is configured to change the resistance force of the resistance device according to a force profile.

15 Claims, 11 Drawing Sheets

US 8,482,517 B1

PROGRAMMABLE ANALOG KEYS FOR A CONTROL DEVICE

BACKGROUND OF THE INVENTION

The present invention relates to a control device, such as a computer mouse, configured to control a computer. More particularly, the present invention relates to analog keys included in a control device.

Computer mice are well known devices used for controlling computers, such as personal computers and the like. While computer mice include numerous devices that allow a user to control various functions of a computer, computer mice manufactures continue to strive to provide users' computer mice with improved features that allow user to control a computer in more convenient ways and in new ways. Further, computer mice manufactures continue to strive to provide mice with improved features that improve users' comfortable use of mice to reduce stress on users' hands and arms.

BRIEF SUMMARY OF THE INVENTION

The present invention provides a control device, such as a computer mouse, configured to control a computer. More particularly, the present invention provides analog keys included in a control device. The mouse according to once embodiment of the invention includes a key having a top surface configured to be pressed by a user. A resistance device is coupled to the key and is configured to provide a resistance force to the key that opposes a user force applied to the top surface. A force sensor is coupled to the resistance device and is configured to detect the user force applied to a top surface. A control circuit is coupled to the resistance device and is configured to change the resistance force of the resistance device according to a force profile. According to a specific embodiment, the force sensor is a force sensing resister, and according to another specific embodiment the force sensor is a capacitive sensor.

The force profile includes an increasing resistance force as the key is pressed to a first distance associated with a threshold force for a key press event, and a lowering resistance force as the key is held at the first distance after the threshold force is applied. The force profile alternatively include an increasing resistance force as the key is pressed to first distance associated with a threshold force for a key press event, and a substantially constant resistance force as the key is released and raises a specified distance. The force profile is user programmable via a computer the control device is configured to control.

According to another specific embodiment of the present invention, the control device further includes a movement tracking device coupled to the control circuit and configured to track movement of the control device, wherein movement tracking of the movement tracking device is decreased if a force less than a threshold force is applied to the key.

According to another embodiment of the present invention, a control device includes a key having a top surface configured to be pressed by a user. A resistance device is coupled to the key and is configured to provide a resistance force to the key that opposes a user force applied to the top surface. A displacement sensor is coupled to the key and is configured to detect a displacement of the key from the user force. A control circuit coupled to the resistance device and the displacement sensor and configured to detect output from the resistance device and the displacement sensor and change the resistance force and/or a height of the key device according to a force profile. The control circuit is further configured to send a control signal to the resistance device and the resistance device is configured to change the resistance force based on the control signal. The control circuit is further configured to detect a displacement of the key without the user force applied to the top surface and send a control signal to the resistance device to change the displacement of the key. A new displacement of the key associated with the control signal is a zero position of the key.

According to a specific embodiment of the invention, the control device further includes a speaker coupled to the control circuit, wherein if the user force exceeds a threshold force the control circuit is configured to send a signal to the speaker to generate an audible signal.

For a further understanding of the nature and advantages of the invention, reference should be made to the following description taken in conjunction with the accompanying drawings and claims.

DETAILED DESCRIPTION OF THE INVENTION

The present invention provides a control device, such as a computer mouse, configured to control a computer. More particularly, the present invention provides a mouse having analog keys that have a user programmable force profile.

Figure 1:
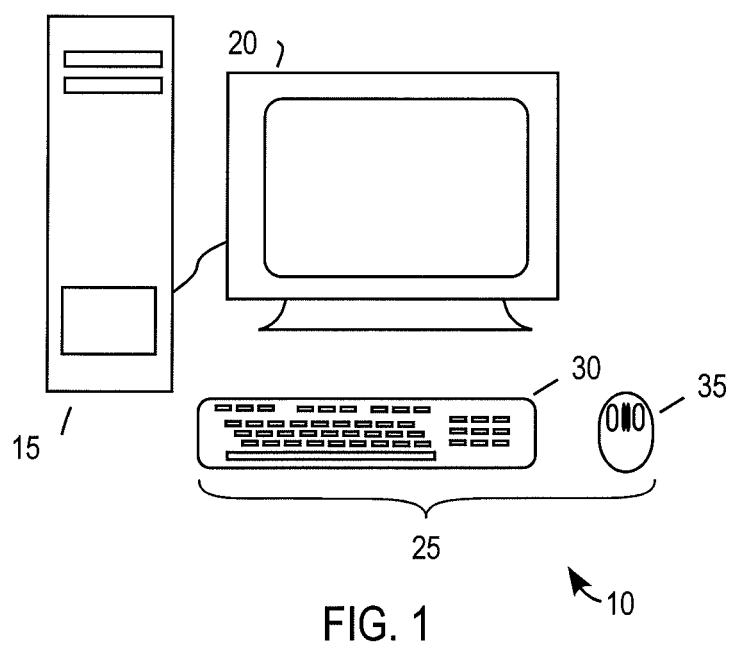
FIG. 1 is a simplified schematic of a computing system according to one embodiment of the present invention.

FIG. 1 is a simplified schematic of a computing system 10 according to one embodiment of the present invention. The computing system includes a computer 15, a display 20, and a set of control devices 25. Computer 15 may be a personal computer that is configured to control display 20 and receive control requests from the control devices. The control devices may include a keyboard 30, a mouse 35, and/or a variety of other control devices not shown, such as joy sticks, trackballs, pucks, etc.

Figure 2A:
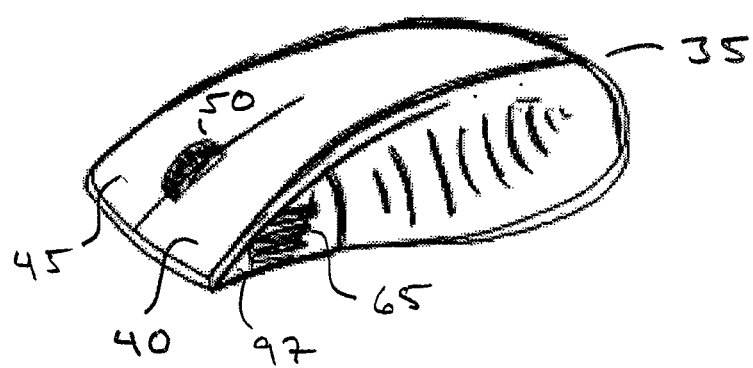
FIGS. 2A and 2B are simplified schematics of a mouse according to one embodiment of the present invention.
Figure 2B:
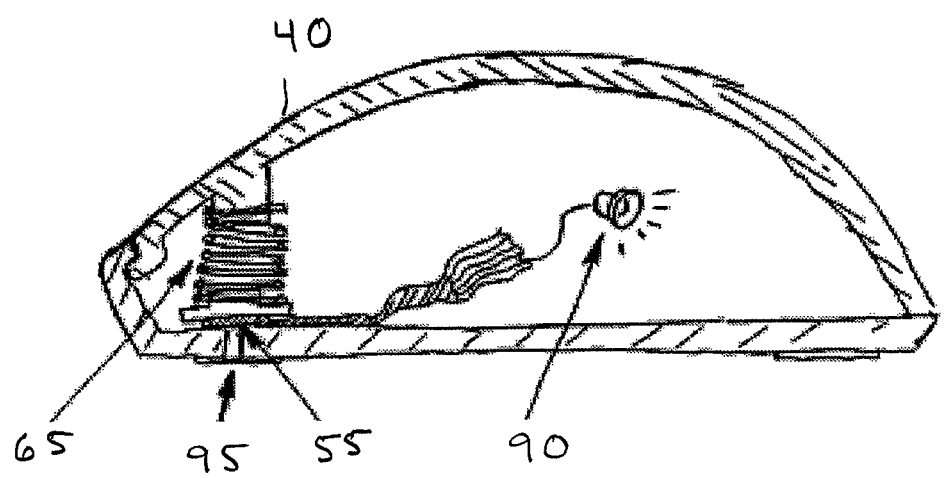

FIGS. 2A and 2B are simplified schematics of a mouse 35 according to one embodiment of the present invention. FIG. 2A is an overall perspective view of mouse 35, and FIG. 2B is a simplified side, cross-sectional view of the mouse. According to one embodiment, mouse 35 includes at least one key 40 and may include a second key 45. Mouse 35 may also include a scroll wheel 50.

Figure 3:
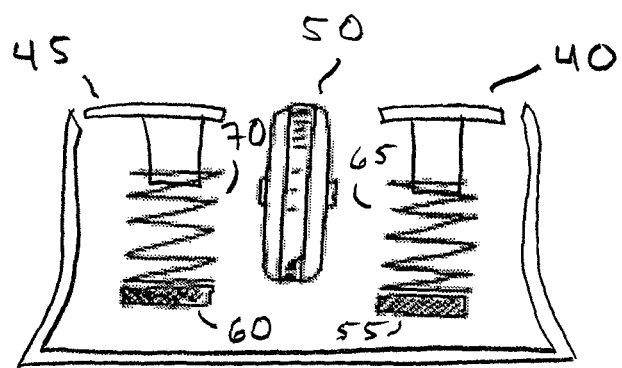
FIG. 3 is a simplified front, cross-sectional view of the mouse.

FIG. 3 is a simplified front, cross-sectional view of mouse 35. As shown in FIG. 3, mouse 35 further includes at least a first force sensor 55 and may include a second force sensor 60. Key 40 may be coupled to force sensor 55 via a first resistance device 65, and key 45 may be coupled to force sensor 60 via a second resistance device 70. Each resistance device may include a spring, an electro-mechanical device, such as a solenoid, and/or other similar devices. That is, a resistance device may be a passive device or an active device. Passive devices include devices that vary a resistance to an external force once the external force is applied. For example, a simple coil spring is a passive device and the resistance it applies only occurs when pushed on by an externally applied force. Active devices include devices that may apply a force or change an applied force in the absence of an externally applied force. For example, a motor is an active device and may be turned on to apply a force without an external force first being applied to the motor.

Figure 4:
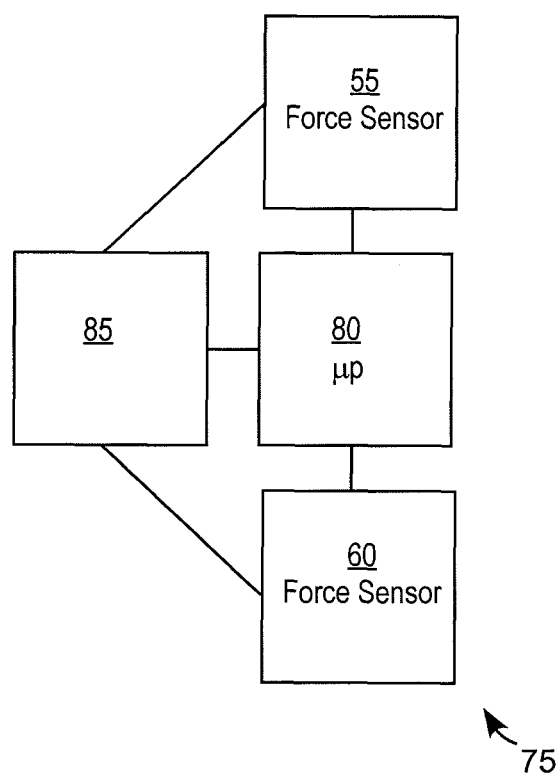
FIG. 4 is a simplified schematic of a control system that may be included in the mouse.

FIG. 4 is a simplified schematic of a control system 75 that may be included in mouse 35. Control system 75 includes at least force sensor 55, and may include force sensor 60. The control system may include a control circuit 80, such as a microprocessor, and a feedback device 85 coupled to the control circuit. The force sensors may be coupled to the control circuit and may be configured to transfer detected force information to the control circuit. The feedback device may be configured to transfer control signals from the control circuit to the resistance device. The feedback device may be a circuit device that transforms digital control signals output by the control circuit to analog signals. The feedback device might include a bus configured to provide a first communication path way between the control circuit and the feedback device, and provide a second communication pathway between the feedback device and the force sensor.

According to one embodiment of the present invention, key 40 is configured to be pressed by a user to control computer 15 and/or display 20. Resistance device 65 is configured to provide a resistance force to key 40 as the key is pressed. Force sensor 55 is configured to detect the force applied to key 40 and output a signal that includes information for the amount of force detected by the force sensor. The force sensor may be a digital device or an analog device, such as a force sensing resistor (FSR), a capacitive sensor with capacitor plates that move closer to one another under increasing force or the like. The control circuit is configured to receive output signals that are output from the force sensor. If the force sensor is an analog device, the control circuit may include an analog to digital converter and convert analog signals received from the force sensor to digital signals. The control circuit may be configured to send a control signal to the computer to indicate that a key press event has occurred. A key press event occurs in the mouse if an amount of force placed on one of the keys meets or exceeds a threshold force. The control circuit may be configured to determine whether the force applied to the force sensor meets or exceeds a threshold force.

Referring again to FIG. 2A, mouse 35 may include an audio device 90, such as a speaker. The audio device may be coupled to one or both of force sensors 55 and 60, or may be coupled to control circuit 80. The speaker is configured to provide audible feedback to the user based on an action of the mouse. For example, the speaker may provide an audible feedback if a key press event has occurred.

According to one embodiment of the present invention, the threshold force for a key press event may be changed. The threshold force may be changed by the computer in response to a user directing the computer to change the threshold force. The threshold force may be changed by a user interacting with the computer via a graphical user interface (GUI) or the like. The computer may be configured to send a control signal to the mouse where the control signal includes information for the a new threshold force. The control circuit may be configured to receive the control signal from the computer via a communication interface (not shown, which may be a wire or a wireless interface), and may be configured to store the control signal. If the resistance device, is for example, a solenoid or the like, the control circuit may be configured to control the solenoid so that the force for the key press event is set to the new threshold force.

According to another embodiment, the keys may be configured to provide a consistent threshold force for a key press event, for example, after the mouse is manufactured and/or between mouse uses. For example, if one of the keys is programmed for a 100 gram threshold force for a key press event, the controller circuit may adjust the resistance device for the existing forces on the key and the force sensor so that the threshold force will be 100 grams. For example, if after the mouse is manufactured, the plastic (or other material) forming the keys "creeps" and the force sensor detects, for example, 10 grams of force due to this plastic creep, then the control circuit may adjust the resistance force on the resistance device so that the threshold force remains at 100 grams of actual force for a key press event. Alternatively, the control circuit may be configured to adjust for the analog signals received from the force sensor taking into account the 10 grams of force detected by the force sensor so that the force the user must apply to the key for a key press event remains at 100 grams.

Referring again to FIGS. 2A and 2B, according to one embodiment of the present invention, mouse 35 may include a manual adjustment device 95 that is configured for adjusting the threshold force for activating a key. The manual adjustment device might be a screw device or the like that raises or lowers the force sensor so that the user may preload the resistance device with a force to in turn raise or lower the threshold force for a key press event. The mouse might include a window 97 so that the resistance device may be seen by a user. The resistance device might be a metal plated spring or the like.

Figure 5:
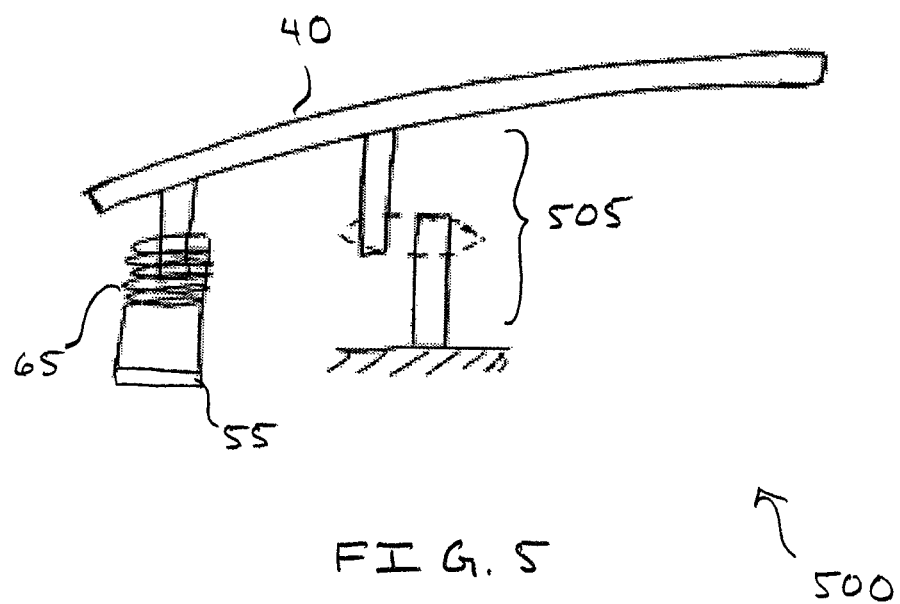
FIG. 5 is a simplified cross-section view of a portion of a mouse according to another embodiment of the present invention.

FIG. 5 is a simplified cross-section view of a portion of a mouse 500 according to another embodiment of the present invention. Mouse 500 differs from the mice described above in that mouse 500 includes a displacement sensor 505 that is configured to determine the distance key 40 is pressed downward by a user. Mouse 500 also includes resistance device 65 that is adjustable by a user for adjusting a resistance force that is applied to the key. For example, an office worker might prefer a relatively small resistance for (e.g., 20 grams).

Figure 6:
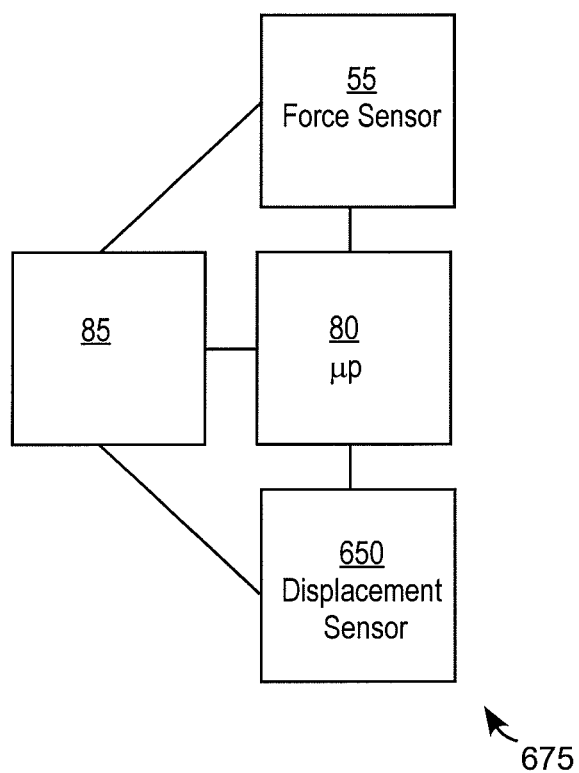
FIG. 6 is a simplified schematic of a control system included in a mouse according to one embodiment of the present invention.

FIG. 6 is a simplified schematic of a control system 675 included in mouse 600 according to one embodiment of the present invention. Control system 675 includes control circuit 80, resistance device 65 coupled to the control circuit, a displacement sensor 650, which is also coupled to the control circuit, and feedback device 85. The control system my be configured to receive output from the force detector and displacement sensor and communicate control signals to the force detector and displacement sensor via the feedback device.

The displacement sensor may be an analog device that is configured to measure the displacement of key 40. If the key is pressed by a predetermined amount, a key press event occurs in the mouse. The displacement sensor might include a variety of devices such as capacitor plates, electro-magnetic (e.g., an inductive coil and a magnetic rod) devices, or the like. The resistance device is configured to provide a resistance force to the key as the key is pressed.

The resistance of the resistance device may be changed by the computer in response to a user directing the computer to change the resistance force. The resistance force may be set similarly to the threshold force as described above.

The resistance device may also be configured to change the height of the key. For example, if the key creeps, the control circuit may be configured to change the height of the key to a "zero position" (e.g., the manufacturer's specification for the key height). As the zero position of the key may be set by the control system, yield losses during manufacturing may be reduced. Also, as a device ages and the key creeps, the key may continue to perform to the manufacturer's specification for a new mouse.

According to a further embodiment of the present invention, the distance through which a key is pressed to generate a key press event may also be changed. This distance may be changed by the computer. For example, the user interacting with the computer via a GUI or the like may set the distance the key may be pressed for a key press event to occur. The computer may communicate the distance to the mouse, which is configured to store the distance and use the distance to signal a key press event back to the computer. Control system 675 may include a memory for storing the distance. The memory might be integrally formed with the control circuit or may be a discrete device. As the displacement device may be an analog device, the control circuit may be configured to detect a substantial continuum of distances through which the key is pressed and activate a key press event for the programmed distance.

According to yet another embodiment of the present invention, the force profile of the key may be programmable. The force profile of a key include the resistance force of the key as the key is pressed down, the resistance force of the key after a key press event, and/or the resistance force of the key as the downward force is released from the key.

Figure 7:
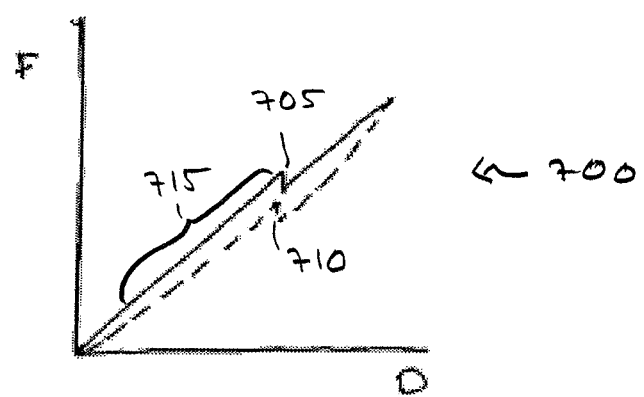
FIG. 7 is a simplified graph of a force profile of a key of a mouse according to an exemplary embodiment of the present invention.

FIG. 7 is a simplified graph of a force profile 700 according to an exemplary embodiment of the present invention. The vertical axis of the graph is the resistance force of the key provided by the key and the resistance device as the key is pressed, and the horizontal axis is the distance of the key travel as the key is pressed. The solid line represents the resistance of the key as the key is pressed downward, and the dashed line represents the resistance force of the key as the key is released. The small declining force 705 in the solid line represents a relatively sudden decrease in the force profile associated with the threshold force being applied for the key press event. The small increasing force 710 in the dashed line represents a relatively sudden decrease in the force profile as the key is released by the user. The resistance force just before the decrease in the resistance force at 705 might be 100 grams or the like. The small decrease in the resistance force at 705 provides a tactile feedback to the user to indicate that threshold force has been applied and that a key press event has occurred. The small increase in the resistance force at 710 provides a tactile feedback to the user to indicate that the key has been released (i.e., a force less than the threshold force is applied to the key and the key is ready for another key press event). According to one embodiment, the resistance device under electronic control of the control circuit may be directed to lower the resistance force on the key for a relatively short period of time at 705 so that the user may feel a lowered resistance and associate the lowered resistance with a key press event.

As shown in FIG. 7, the force profile of the resistance force against a downward press may be substantially similar to the profile of resistance force as the downward force is released from the key. One physical pain point and muscle fatigue associated with key presses of a mouse are associated with pressing a key down and then holding the key down to perform a subsequent function, such as moving (or "dragging") the mouse as the key is held down.

According to one embodiment, the force profile of the keys may be changed (i.e., programmable) and may be set via the computer. Specifically, the threshold force for the key press event may be set via a GUI, and independently of the threshold force being set, the force necessary to hold the key down after the threshold force is applied may be independently set (e.g., also via the GUI). For example, the threshold force for a key press event might be 100 grams, and then the force necessary for holding the key down after the threshold force has been applied may be reduced to 10 grams. The force profile may be placed on the key by the resistance device under the control of the control circuit, which may receive the force profile information from the computer.

Figure 8:
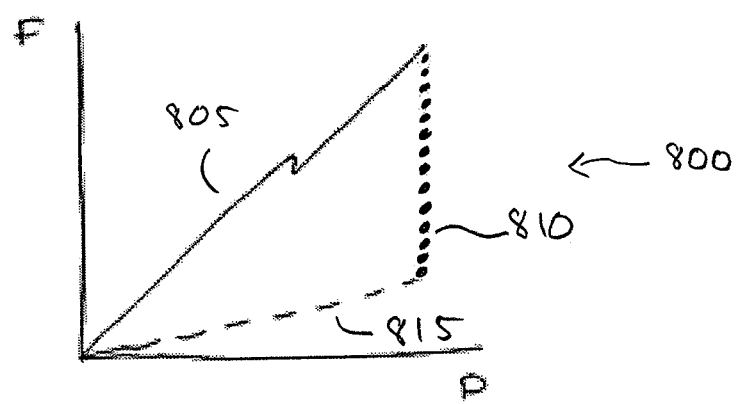
FIG. 8 is a simplified graph of another force profile according to another exemplary embodiment of the present invention.

FIG. 8 is a simplified graph of a force profile 800 according to another exemplary embodiment of the present invention. The solid line 805 represents the resistance of the key as the key is pressed downward, the dotted line 810 represents the resistance force as the key is held down after the threshold force has been applied, and the dashed line 815 represents the resistance force of the key as the key is released. As seen in FIG. 8, after the threshold force is applied to the key, and the key is hold down by a given amount, the resistance force of the key on the user's finger may be lowered (dotted line of the force profile). The user may then hold down the key applying a lower force than the threshold force to perform a subsequent action such as moving the mouse across a work surface to perform another function.

Figure 9:
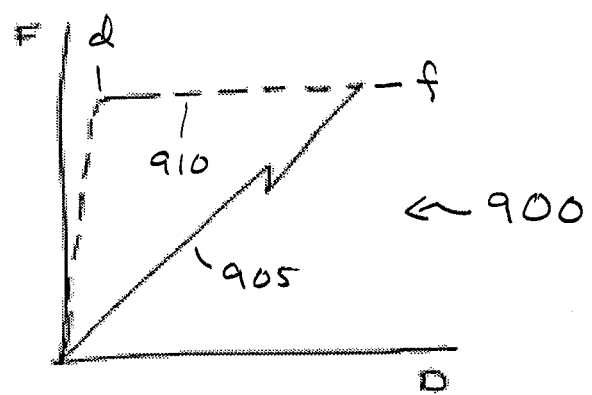
FIG. 9 is a simplified graph of another force profile according to another exemplary embodiment of the present invention.

FIG. 9 is a simplified graph of a force profile 900 according to another exemplary embodiment of the present invention. Again, the solid line 905 represents the resistance of the key as the key is pressed downward, and the dashed line 910 represents the resistance force of the key as the key is released. As seen in FIG. 9, after the threshold force is applied to the key, and the key is held down by a given amount, the resistance force of the key on the user's finger may be held at a relatively high level "f" (see FIG. 9). Further, as the key is released by the user, the resistance force on the key may remain at the relatively high level "f" until the key has traveled upward to distance "d" (see FIG. 9). The relatively high resistance force of the key as the key is released by the user provides that the key may be returned to a neutral position relatively quickly (e.g., relatively quicker than if the return force on the key is lowered after the threshold force is placed on the key as shown in FIG. 8). The neutral position of the key is represented as the origin of the force profile where the forces on the key are balanced without the user exerting force on the key. A relatively quick return of the key to the neutral position may be useful for game playing with the mouse were it may be desirable to perform a number of key press event in relatively quick succession as is often used in game play.

Figure 10:
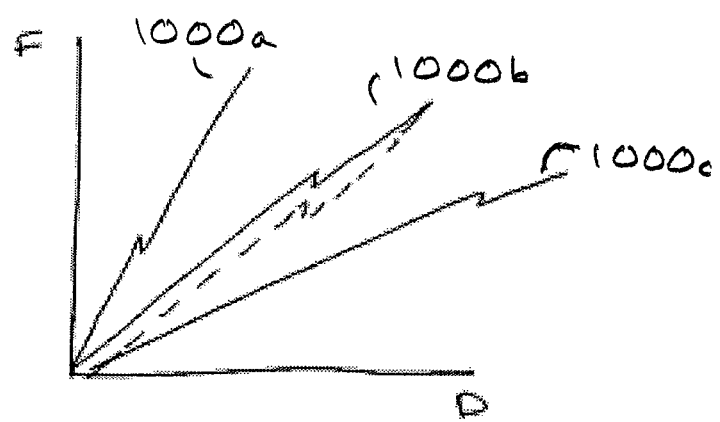
FIG. 10 is a simplified graph of three force profiles according to another embodiment of the present invention.

FIG. 10 is a simplified graph of three force profiles 1000a, 1000b, and 1000c according to another embodiments of the present invention. As the threshold force and key travel for a threshold event may be independently programmed, a user may interact with the computer's GUI to program these or other force profiles. As described above, the user may interact with the GUI to set the force profile, the threshold force for a key press event, the key travel for the threshold force, and other parameters for the key. The computer may be configured to transfer these setting to the control circuit of the mouse so that the control circuit may apply these setting to the resistance device and to track the distances through which the key travels via the displacement sensor and to track the force on the key via the force sensor. While various programming environments have been described where the computer is configured to accept user input for settings of the resistance sensor and/or displacement sensor, other embodiments of the present invention include interactive devices on the mouse which are configured to accept input for programming these settings. Those of skill in the art will be readily aware of how such interactive devices may be included in the mouse and will not be described in detail herein.

Referring again to FIG. 7, the control circuit is configured to detect a force 715 applied by the user on the key prior to the user applying the threshold force. The mouse may be configured to control various mouse functions and/or computer functions (described below in detail) based on detected force 715, which is less than the threshold force. The detected force at which the mouse is configured to control various mouse and/or computer functions may be programmed by the computer via a user interacting with a GUI displayed on the computer (described above in detail). For example, the user may have the detected force 715 programmed sufficiently high so that the user's finger resting on the key will be less than the detected force 715. While force 715 is shown in FIG. 7 as a range of forces, force 715 may be a single threshold type force.

If force 715 is detected, the control circuit may be configured to decrease the sensitivity of movement tracking of the mouse. As is well known, mice typically include movement tracking devices, such as roller balls, optical sources and optical detectors, accelerometers and the like for tracking the movement of a mouse as the mouse is moved across a work surface (e.g., a desk top) and/or in free space (e.g., not on a work surface). A key press may cause the mouse to move, for example, via involuntary muscle movement of the user. Movement of the mouse as the key is pressed, may cause an on-screen pointer to no longer point at a desired screen button. If the on-screen pointer no longer points at the desired screen button as the threshold force is applied, then any desired function associated with the screen button may not occur. According to embodiments of the present invention, movement tracking of the movement tracking device may be decreased as the key is pressed (i.e., as force 715 is detected) so that an on-screen pointer will not be moved sufficiently so that the on-screen pointer remains pointed at the desired screen button. The resistance detector may be configured to detect force 715 and communicate detection of this force to the control circuit, which may thereafter lower movement tracking device in the mouse.

According to a further embodiment of the present invention, movement tracking of the mouse may be lowered as forces less than the threshold force increase on the key. That is, as a user presses with increasing force on the key, the sensitivity of movement tracking may be proportionally lowered, for example, until the movement sensitivity is turned off. Such mouse options might be used advantageously by a user to slow the movement of an on-screen pointer deliberately so that a relatively small screen option (e.g., small screen button) may be selected, for example, without overshooting the screen option.

According to a further embodiment, various software options of a computer program operating on the computer are changed as a force 715 is detected or as increasing key forces are detected. For example, for a draw program, such as a tablet emulation program, the thickness of lines being drawn may be increased if force 715 is detected. The thickness of lines being drawn might be increased in some proportion to increasing forces detected on the key that are less than the threshold force. Another software option that might be changed with increasing force applied to a key may be a gaming software option. For example, a firing speed in a game might be increased as the force applied to the key is increased. According to another software game option, different weapons might be configured to be fired with different forces applied to the key. According to another software option, a relatively low force applied to the key may be interpreted by the control circuit as a single "click" of the key, where a relatively higher force applied to the key may be interpreted by the control circuit as a double "click" of the key.

According to a further embodiment of the present invention, the mouse may include a tilt roller. The mouse may include a first and second force sensors configured to detect left and right lateral forces, respectively, placed on the tilt roller. The force sensors may be the analog sensor described above. With increasing force applied laterally to the tilt roller, a function associated with the tilt may be executed at a higher rate, lower rate, etc. For example, if relatively high or low forces are laterally placed on the tilt roller, a graphic displayed on a roller may be panned are relatively high or low speeds, respectively.

While the present invention has been described herein with reference to particular embodiments thereof, a latitude of modification, various changes, and substitutions are intended in the present invention. In some instances, features of the invention may be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A control device comprising:
    a key having a top surface configured to be pressed by a user;
    a resistance device coupled to the key and configured to provide a resistance force to the key that opposes a user force applied to the top surface;
    a force sensor coupled to the resistance device and configured to detect the user force applied to top surface; and
    a control circuit coupled to the resistance device and configured to change the resistance force of the resistance device according to a force profile, wherein the force profile includes an increasing resistance force as the key is pressed to a first distance associated with a threshold force for a key press event, and a lowering resistance force as the key is held at the first distance after the threshold force is applied.

2. The control device of claim 1, wherein the force sensor is a force sensing resister.

3. The control device of claim 1, wherein the force sensor is a capacitive sensor.

4. The control device of claim 1, further comprising a movement tracking device coupled to the control circuit and configured to track movement of the control device, wherein movement tracking of the movement tracking device is decreased if a force less than a threshold force is applied to the key.

5. The control device of claim 1, wherein the force profile is user programmable via a computer the control device is configured to control.

6. A control device comprising:
- a key having a top surface configured to be pressed by a user;
- a resistance device coupled to the key and configured to provide a resistance force to the key that opposes a user force applied to the top surface;
- a displacement sensor coupled to the key and configured to detect a displacement of the key from the user force; and
- a control circuit coupled to the resistance device and the displacement sensor and configured detect output from the resistance device and the displacement sensor and change the resistance force according to a force profile, wherein the force profile includes an increasing resistance force as the key is pressed to a first distance associated with a threshold force for a key press event, and a lowering resistance force as the key is held at the first distance after the threshold force is applied.

7. The control device of claim 6, wherein the control circuit is configured send a control signal to the resistance device and the resistance device is configured to change the resistance force based on the control signal.

8. The control device of claim 6, wherein the control circuit is configured to detect a displacement of the key without the user force applied to the top surface and send a control signal to the resistance device to change the displacement of the key.

9. The control device of claim 8, wherein a new displacement of the key associated with the control signal is a zero position of the key.

10. The control device of claim 6, further comprising a speaker coupled to the control circuit, wherein if the user force exceeds a threshold force the control circuit is configured to send a signal to the speaker to generate an audible signal.

11. The control device of claim 6, further comprising a movement tracking device coupled to the control circuit and configured to track movement of the control device, wherein movement tracking of the movement tracking device is decreased as a force lower than a threshold force is applied to the key.

12. The control device of claim 6, wherein the force profile is user programmable via a computer the control device is configured to control.

13. A control device comprising:
- a key having a top surface configured to be pressed by a user;
- a resistance device coupled to the key and configured to provide a resistance force to the key that opposes a user force applied to the top surface;
- a displacement sensor coupled to the key and configured to detect a displacement of the key from the user force; and
- a control circuit coupled to the resistance device and the displacement sensor and configured to detect output from the resistance device and the displacement sensor and change the height of the key device according to a force profile.

14. A control device comprising:
- a key having a top surface configured to be pressed by a user;
- a resistance device coupled to the key and configured to provide a resistance force to the key that opposes a user force applied to the top surface;
- a force sensor coupled to the resistance device and configured to detect the user force applied to top surface; and
- a control circuit coupled to the resistance device and configured to change the resistance force of the resistance device according to a force profile, wherein the force profile includes an increasing resistance force as the key is pressed to a first distance associated with a threshold force for a key press event, and a substantially constant resistance force as the key is released and raises a specified distance.

15. A control device comprising:
- a key having a top surface configured to be pressed by a user;
- a resistance device coupled to the key and configured to provide a resistance force to the key that opposes a user force applied to the top surface;
- a displacement sensor coupled to the key and configured to detect a displacement of the key from the user force; and
- a control circuit coupled to the resistance device and the displacement sensor and configured detect output from the resistance device and the displacement sensor and change the resistance force according to a force profile, wherein the force profile includes an increasing resistance force as the key is pressed to a first distance associated with a threshold force for a key press event, and a substantially constant resistance force as the key is released and raises a specified distance.

* * * * *